Feb. 13, 1951 — P. LEON — 2,541,524
DEMIJOHN FILTER
Filed May 13, 1946
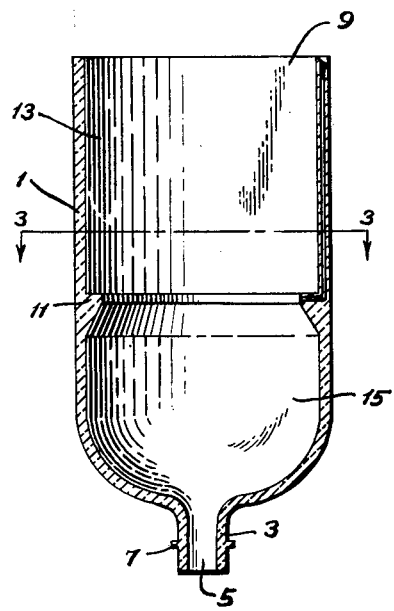
Fig. 1.
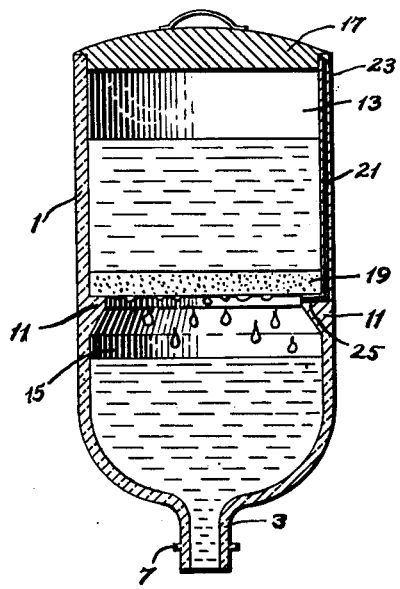
Fig. 2.
Fig. 3.
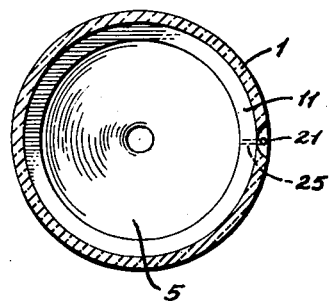
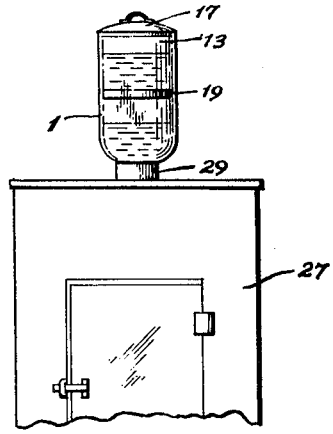
Fig. 4.
INVENTOR.
Pedro Leon
BY
ATTORNEYS
Peck & Peck Patented Feb. 13, 1951

2,541,524

UNITED STATES PATENT OFFICE 2,541,524

DEMIJOHN FILTER

Pedro León, Habana, Cuba

Application May 13, 1946, Serial No. 669,358
In Cuba June 16, 1945

1 Claim. (Cl. 210—106)

This invention relates generally to the art of liquid filtering, and in its more specific aspects, it is primarily concerned with the provision of means associated with demijohns, whereby the liquid, such as water, therein, is purified; and the nature and objects of the invention will be readily recognized and understood by those skilled in the arts to which it relates in the light of the following explanation and detailed description of the accompanying drawings illustrating what I, at present, believe to be the preferred embodiments and mechanical expressions of the invention, from among various other forms, arrangements, combinations and constructions, of which the invention is capable within the spirit and scope thereof.

It is a fundamental object of my invention to provide a reservoir for water which provides means therein for filtering the water as it passes through the reservoir.

A further object of my invention is to provide a reservoir in the form of a demijohn and to form the demijohn with means for supporting a filtering element therein in such position that the water in flowing through the demijohn will pass through the filter for the purification thereof.

Another object of my invention is to so construct a water reservoir or demijohn that it will be divided into two cavities or compartments by means of a filter element, one for containing filtered water and the other compartment containing unfiltered water.

And yet another object of my invention is to provide a water reservoir or demijohn which is divided into two cavities or compartments by means of a filtering element which is disposed therein, said demijohn being provided with vent means for permitting the ingress of air into one of said compartments as the purified water is drawn therefrom.

Another object of my invention is to provide a filtering demijohn or water reservoir which may be associated with facility with ice boxes which are generally known as demijohn ice boxes which are adapted to mount a demijohn for receiving and cooling liquid therefrom.

With the foregoing general objects, features, and results in view, as well as certain others which will be apparent from the following explanation, the invention consists in certain novel features and designs, construction, mounting and combination of elements, as will be more fully and particularly referred to and specified hereinafter.

Referring to the accompanying drawings:

Fig. 1 of the drawings, is a vertical sectional view, the filtering element not being disposed therein.

Fig. 2 of the drawings, is a view generally similar to Fig. 1 of the drawings, but with the filtering element and lid in operative position and the demijohn being filled with water for the filtering operation.

Fig. 3 of the drawings, is a view taken on line 3—3 of Fig. 1 of the drawings.

Fig. 4 of the drawings, is a view with parts thereof broken away of the demijohn of this invention mounted in operative association with an ice box.

The liquid filtering reservoir of this invention comprises a glass, or other plastic, preferably transparent container 1 in the form of a demijohn. The container is provided at its lower end with a neck 3 forming a constricted water or other liquid outlet 5, and projecting from the neck 3, I form a pair of oppositely disposed lugs or fillets 7 for a purpose to be hereinafter described. It will be noted that the opposite or inlet end 9 of the container 1 is open so that water or other liquid may be poured into the container at this end.

At substantially the longitudinal center of the container 1, I provide a preferably, though not necessarily, integrally formed annular flange 11 which projects inwardly into the container 1 to provide a ledge, support or the like, having a substantially flat upper surface. This inwardly directed annular flange 11 divides or denotes the position in the container 1 of two cavities or compartments, an upper unfiltered water receiving compartment 13, and a lower filtered water compartment 15. I provide a lid or cover 17 for covering the upper open end of the container 1, the lower end of the container is formed with the neck portion 3 for flow of filtered water therefrom.

The flange 11 provides a support or base for a removable filtering stone or the like 19 which is of substantially the same diameter as the internal diameter of the upper compartment 13 of the container, so that the filtering stone has a close sliding fit with the interior walls of the container. While I have described the filtering element 19 as being a filtering stone, it is to be distinctly understood that any type of annular filtering element which functions to remove impurities from water, may be employed.

I provide the wall of the upper compartment 13 with a longitudinally extending perforation or slot 21 therein which extends upwardly to the upper edge of the wall of the compartment 13 where it opens to the atmosphere, the upper edge of the wall at the opening of the perforation or slot 21 being bevelled or chamfered as at 23, so that air may enter the perforation under the flange of the lid 17. At the lower end the perforation or slot 21 extends downwardly into the flange 11 where it extends inwardly as at 25 to open into the upper interior portion of the lower compartment 15 of the container 1.

In using the water filtering reservoir or container of this invention, the container 1 is preferably disposed in operative position in a demijohn ice box 27 which is provided with an upstanding collar 29 on the top thereof for receiving the neck 3 of the container therein, the lugs 7 fitting in bayonet or the like slots which are provided in the collar 29 so that the container may be securely disposed in operative position in the ice box.

The filtering element 19 is then disposed in its position on the annular inwardly extending flange 11 dividing the container into the compartments 13 and 15. The upper compartment 13 of the container is then filled with water by pouring the same into the upper open end 9 thereof, and when a sufficient quantity of water has been placed in the container, the lid or cover 17 is disposed thereon. Referring particularly to Fig. 2 of the drawings wherein the filtering action of the reservoir is illustrated, it will be evident that the impure or unfiltered water in the compartment 13 will seep through the filtering element 19 into the filtered water compartment 15 from whence it will flow through the neck 3 as the pure water is used. As the water is drawn from the compartment 15, air will be vented therein through the perforation or slots 21 and 25. If the lid or cover 17 forms a close fit with the upper end 9 of the container, vent holes may be provided therein for permitting air to enter the upper compartment 13 as the water passes through the filtering element 19 into compartment 15.

In this particular novel and unique arrangement of filter-reservoir, the filter may be removed for cleaning or renewal with ease. In order to do this when the demijohn is emptied, it is uncovered and lowered, and the hand is then introduced into the container until it touches the filter whereupon the reservoir is inverted and the filtering stone withdrawn gradually. After the stone is washed, it is replaced in the reservoir upon the flange, and the entire outfit is installed in the ice box.

I claim:

A liquid filtering reservoir, comprising a plastic container of open ended form, the inlet end being of the same diameter as the body of the container and adapted to be closed by a removable lid and the outlet end of the container being of restricted diameter relative to the inlet end forming a neck integral with the container, lugs projecting radially from the neck, and the neck and lugs adapted to be removably received in an icebox for mounting the container thereon, a flange formed integral with said container wall and projecting inwardly therefrom intermediate the ends thereof to fix the positions of two cavities within the container, one cavity being an unfiltered liquid cavity and the other being a filtered liquid cavity, a removable filter element mounted on and supported by said flange and separating said two cavities to thereby filter liquid flowing from one cavity to the other, and venting means for said filtered liquid cavity from which filtered water is drawn through said liquid outlet, said venting means including a longitudinally extending perforation formed within the wall of the unfiltered liquid cavity and extending through the top edge of said wall, the top edge of the wall being chamfered at the perforation and the perforation being open to the atmosphere solely at the chamfered portion of the wall, the lid for the inlet end of the container when in operative position extending over but spaced from the edge of the wall at the perforation, and the perforation extending from the chamfered top edge of the wall and within the wall of the unfiltered liquid cavity and extending through the upper portion of the flange and opening into the filtered liquid cavity at the inner edge of the flange adjacent to the lower surface of the removable filter element.

PEDRO LEÓN.

REFERENCES CITED

The following references are of record in the file of this patent:

UNITED STATES PATENTS

| Number | Name | Date |
|---|---|---|
| 9,760 | Jennison | May 31, 1853 |
| 339,791 | Lambertson | Apr. 13, 1886 |
| 648,904 | Hart | May 1, 1900 |
| 928,138 | Lewis | July 13, 1909 |
| 1,293,173 | Northrup | Feb. 4, 1919 |
| 1,696,487 | Jervis | Dec. 25, 1928 |
| 1,837,660 | Hassensall | Dec. 22, 1931 |
| 1,866,466 | Hassensall | July 5, 1932 |

FOREIGN PATENTS

| Number | Country | Date |
|---|---|---|
| 7,088 | Great Britain | May 26, 1886 |
| 10,343 | Great Britain | 1894 |
| 12,556 | Great Britain | 1892 |